US008175939B2

(12) United States Patent
Howe et al.

(10) Patent No.: US 8,175,939 B2
(45) Date of Patent: May 8, 2012

(54) MERCHANT POWERED CLICK-TO-CALL METHOD

(75) Inventors: Benita A. Howe, Covington, WA (US); Jeffrey D. Smith, Sammamish, WA (US); Tayfun Kon, Redmond, WA (US)

(73) Assignee: Microsoft Corporation, Redmond, WA (US)

(*) Notice: Subject to any disclaimer, the term of this patent is extended or adjusted under 35 U.S.C. 154(b) by 994 days.

(21) Appl. No.: 11/262,358

(22) Filed: Oct. 28, 2005

(65) Prior Publication Data

US 2007/0112656 A1    May 17, 2007

(51) Int. Cl.
*G06Q 40/00* (2006.01)
(52) U.S. Cl. ............. 705/35; 705/14.41; 705/14.64; 705/14.69; 705/14.73; 709/231; 379/93.09; 379/100.14
(58) Field of Classification Search .......... 705/14, 705/35, 14.41, 14.54, 14.69, 14.73; 709/231; 379/93.09, 100.14
See application file for complete search history.

(56) References Cited

U.S. PATENT DOCUMENTS

| | | | |
|---|---|---|---|
| 5,555,290 A | 9/1996 | McLeod et al. | |
| 6,163,604 A | 12/2000 | Baulier et al. | |
| 6,185,194 B1 | 2/2001 | Musk et al. | |
| 6,236,722 B1 | 5/2001 | Gilbert et al. | |
| 6,337,858 B1 | 1/2002 | Petty et al. | |
| 6,356,755 B1 | 3/2002 | Valentine et al. | |
| 6,393,113 B1 | 5/2002 | Karras | |
| 6,418,212 B1 | 7/2002 | Harrison et al. | |
| 6,516,056 B1 | 2/2003 | Justice et al. | |
| 6,697,462 B2 | 2/2004 | Raymond | |
| 6,801,607 B1 | 10/2004 | Marchand et al. | |
| 6,862,572 B1* | 3/2005 | de Sylva | 705/7 |
| 7,315,518 B1 | 1/2008 | Siegrist | |
| 2001/0028642 A1* | 10/2001 | Veschi | 370/352 |
| 2002/0054671 A1* | 5/2002 | Wiener et al. | 379/88.22 |
| 2002/0111873 A1* | 8/2002 | Ehrlich et al. | 705/26 |
| 2002/0164006 A1 | 11/2002 | Weiss | |

(Continued)

FOREIGN PATENT DOCUMENTS

EP    1545087 A1    6/2005

(Continued)

OTHER PUBLICATIONS

Office Action dated Nov. 29, 2010, Chinese Patent Application No. 200680040336.4.

(Continued)

*Primary Examiner* — Jagdish Patel
*Assistant Examiner* — Kevin Poe
(74) *Attorney, Agent, or Firm* — Vierra Magen Marcus & DeNiro LLP (57) ABSTRACT

A method is disclosed for enhancing the predictability, scalability and cost effectiveness of online advertising with voice over IP connectivity and event tracking technologies. A service provider maintains a list of merchants who have offered to pay for customer VoIP calls to their establishment. The service provider maintains a real time connection with this merchant list and renders an advertisement in a distinguishing way in real time. A potential customer who views this advertisement on a web page may establish a VoIP call session with a merchant by selecting a free click-to-call link on the web page. When the customer places the call, the service provider pays for the call. Merchants in turn pay the service provider for displaying the ads that generated the calls on a price per call, price per impression or fixed fee basis.

20 Claims, 4 Drawing Sheets

U.S. PATENT DOCUMENTS

| | | | |
|---|---|---|---|
| 2002/0188680 A1 | 12/2002 | McCormack et al. | |
| 2004/0071130 A1* | 4/2004 | Doerr et al. | 370/352 |
| 2004/0120484 A1 | 6/2004 | Buzbee | |
| 2004/0165707 A1 | 8/2004 | Raymond | |
| 2004/0249801 A1* | 12/2004 | Kapur | 707/3 |
| 2005/0074102 A1* | 4/2005 | Altberg et al. | 379/114.1 |
| 2005/0084083 A1 | 4/2005 | Lawyer et al. | |
| 2005/0141488 A1* | 6/2005 | Shtivelman | 370/352 |
| 2005/0154649 A1* | 7/2005 | Jalili | 705/26 |
| 2005/0216341 A1* | 9/2005 | Agarwal et al. | 705/14 |
| 2005/0222908 A1* | 10/2005 | Altberg et al. | 705/14 |
| 2006/0029203 A1 | 2/2006 | Bhusri | |
| 2006/0074760 A1* | 4/2006 | Helin et al. | 705/26 |
| 2006/0100928 A1* | 5/2006 | Walczak et al. | 705/14 |
| 2006/0259365 A1* | 11/2006 | Agarwal et al. | 705/14 |
| 2007/0041523 A1 | 2/2007 | Paden et al. | |
| 2007/0047532 A1 | 3/2007 | Bangor et al. | |
| 2007/0147343 A1* | 6/2007 | Sasaki et al. | 370/352 |
| 2007/0162334 A1* | 7/2007 | Altberg et al. | 705/14 |
| 2008/0080691 A1 | 4/2008 | Dolan et al. | |
| 2008/0181202 A1* | 7/2008 | O'Brien et al. | 370/352 |

FOREIGN PATENT DOCUMENTS

| | | |
|---|---|---|
| JP | 2001249927 | 9/2001 |

OTHER PUBLICATIONS

Estevez, et al., "Subscription Fraud Prevention in Telecommunications using Fuzzy Rules and Neural Networks," vol. 31, No. 2, 2006 (in press), pp. 1-31, Santiago, Chile, http://www.cec.uchile.cl/~pestevez/public.html.

"Calling Line Identification The Claimed Needs of Dial-Up ISPs," Jul. 25, 2003, pp. 1-9, Attachment 4, Electronic Frontiers Australia, http://www.efa.org.au/Issues/Privacy/cni-complaints/cni-isps-noneed.html.

Rohit Dhamankar, "Intrusion Prevention: The Future of VoIP Security," 2004, TippingPoint Technologies, Inc., pp. 1-22.

International Search Report and Written Opinion dated Jan. 30, 2008 in PCT Application No. PCT/US2007/078374.

Office Action dated Apr. 28, 2010, U.S. Appl. No. 11/538,265.

Response to Office Action filed Jul. 13, 2010, U.S. Appl. No. 11/538,265.

Office Action dated Oct. 5, 2010, U.S. Appl. No. 11/538,265.

Response to Office Action filed Mar. 7, 2011, U.S. Appl. No. 11/538,265.

Respone to Office Action filed Apr. 13, 2011, Chinese Patent Application No. 200680040336.4.

English summary and translation of claims of Response to Office Action filed Apr. 13, 2011, Chinese Application No. 200680040336.4.

Final Office Action dated May 23, 2011, U.S. Appl. No. 11/538,265.

Response to Final Office Action filed Sep. 20, 2011. U.S. Appl. No. 11/538,265.

Response to Office Action filed Sep. 29, 2011 in European Patent Application No. 06825576.9.

Notice of Rejection dated Nov. 4, 2011, Japanese Patent Application No. 2008-537731.

English Abstract and Machine Translation of Publication No. JP2001-249927 published Sep. 14, 2001.

* cited by examiner

Fig. 3

Fig. 5

MERCHANT POWERED CLICK-TO-CALL METHOD

BACKGROUND

1. Field of the Present System

The present system is directed to methods for improving online advertising with voice over IP connectivity and event tracking.

2. Description of the Related Art

The World Wide Web has made it easy for consumers and merchants to find each other. Consumers utilize search engines and keyword searches to identify merchants of desired goods and services, and then websites and other on-line research tools allow consumers to sift through the results to find what they are looking for. For merchants, sponsored searches and pay for placement advertising allow merchants to get their products and services in front of target consumers, i.e., consumers who have already indicated an interest in those products or services.

In the pay for placement model, merchants may subscribe with an enterprise service provider, such as MSN®, Yahoo® and AOL® service providers, for presentation of their advertisements in response to a given search query. In particular, a merchant may set up the subscription by specifying keywords relating to their goods/services, so that when a consumer performs a search including these keywords, the merchant's advertisement is presented along with the rest of the search results. The merchant is typically billed in a pay-per-click (PPC) model, where the merchant is charged each time a consumer selects the merchant's advertisement by clicking on it and being transferred to the merchant's site (or otherwise provided with information of the merchant's choosing). The number of times that an advertisement is clicked on, divided by the number of times that the advertisement appears, is referred to as the click through rate (CTR) for the advertisement.

Merchants have become sophisticated in their advertising techniques. Many merchants employ software tools and operational resources in an attempt to accurately and regularly track the CTR and success rate of their advertisements. Merchants are constantly seeking new and improved methods for obtaining information about their advertising campaigns and target audience in an attempt to maximize their advertising exposure to their target audience, and the return on their advertising dollars.

Despite the ubiquity of the Internet as an advertising tool, many consumers still prefer to speak to a live person at the merchant's place of business, to find out additional information and complete a sale. While traditional public switched telephone networks (PSTN) are still the preferred mode of telephone communication, voice over IP (VoIP) is gaining in popularity. VoIP operates by delivering voice information over the Internet using the Internet Protocol (IP), which sends voice information in digital form in discrete packets rather than in the traditional circuit-committed protocols of the PSTN.

On-line advertising has expanded to take advantage of VoIP. For example, in the click-to-call (C2C) model, a user can locate an advertiser, either through unsponsored search results or via the sponsored PPC model, and then click on a provided telephone number to connect to the merchant using IP telephony. As the majority of merchants receive telephone calls using traditional PSTN telephones, the C2C model generally results in telephone charges to the consumer. Often, a consumer will decide not to call a merchant because the consumer does not want to incur the telephone charges. By not receiving these calls, at least a portion of which would have resulted in sales, the merchant is losing potential revenue.

To entice more consumers to call, a merchant can purchase a toll free phone number from a telecommunications service provider and thus pay for incoming calls on behalf of customers. Toll free phone numbers are expensive however, and their costs difficult to contain. If more customers call the toll free number or if calls last longer than expected, merchants may be left with significant unanticipated costs to cover.

Additionally, a merchant who purchases a toll free number still has to make sure that interested customers can find it. Many customers use published business directories, often referred to as Yellow Pages, to find businesses. Many merchants pay the directory publishers for regular or enhanced listings in these directories in the hope of attracting more customers. Directory listings are expensive however, and cannot be easily adjusted over periods of time. Furthermore, it is difficult for a merchant to know whether paying for directory listings is a productive marketing investment, since they cannot easily track which customers were attracted to the business from a directory listing versus other forms of advertising.

SUMMARY

The present system, roughly described, relates to enhancing the predictability, scalability and cost effectiveness of online advertising with voice over IP connectivity and event tracking technologies.

In embodiments, a service provider maintains a list of merchants who want customers leads referred to them in the form of phone calls. The service provider displays advertisements on behalf of merchants with the intent of encouraging customers to call participating businesses. These advertisements may be displayed in online search results, in text links or banner ads on websites, or in text or graphical advertising displayed in a communications client such as an instant messaging or email application.

Each of the advertisements displayed contains a clickable button or link that allows a user to instantly initiate a voice over IP call to the advertised merchant. The service provider pays for the call, and while the caller or the merchant may use their traditional PSTN phone lines, neither will incur telecommunications charges.

The service provider may be an enterprise service provider, such as MSN®, Yahoo®, AOL®, or other online service providers. Alternatively or additionally, the service provider may be a partner to enterprise service providers, including search engines and online directories such as 411.com, whitepages.com and yellowpages.com.

Upon a merchant initially signing up with the service provider for the free click-to-call service, the merchant is added to a white list that is stored on a secure database and updated in real time. The white list stores a unique identifier which may be mapped within the database to the merchant's name and telephone number. After a merchant subscribes to the service, potential customers may access the merchant's advertisement from a web page provided over a network such as the Internet, or from a communications client such as an instant messaging or email application.

The service provider determines where and how often merchant advertisements are displayed and may adjust advertisement display schedules based on end user behavior (e.g. frequency with which previous advertisements were clicked) and/or based on the expected cost of completing calls. Thus, merchants that are willing to pay high advertising rates and that close sales with relatively short phone calls may have their ads displayed prominently and frequently. Merchants who pay less or have lengthy phone conversations with their customers may receive less prominent or frequent advertisement.

When a potential customer clicks on the merchant advertisement, the unique identifier for the selected merchant is passed to the white list. The white list retrieves an approved telephone number associated with the unique merchant identifier, which telephone number is then used to establish a telephone session between the potential customer and the merchant.

The service provider may additionally store demographic information relating to call. In embodiments, the call information includes the place from which the potential customer placed the telephone call, the time the telephone call was placed, and/or the duration of the telephone call. Both the service provider and the merchant may use this information to determine the effectiveness of their advertisements and allows merchants to focus their advertisements and sales efforts where they will provide the greatest returns.

DETAILED DESCRIPTION

Embodiments of the present system will now be described with reference to FIGS. 1-5 which in general relate to a method for increasing merchant revenues through on-line advertising and VoIP connectivity. Current VoIP scenarios require an end user or a merchant to pay for all VoIP calls that are terminated via PSTN. Embodiments of the present system relate to a business model and associated technology to encourage VoIP usage, drive revenue, and increase the value of advertising on a network. A network maintains a list of merchants who have offered to pay for customer VoIP calls to their establishment. In an embodiment, when a user search reveals terms that suggest a user may be interested in one of these merchants, the merchant's advertisement is surfaced and demarcated in a distinguishing manner to alert the user that a VoIP call to this merchant is free. The network maintains a real time connection with this merchant list and renders an advertisement in a distinguishing way in real time. When the user places the call, the network provider pays for the call and is reimbursed by the merchant.

Figure 1:
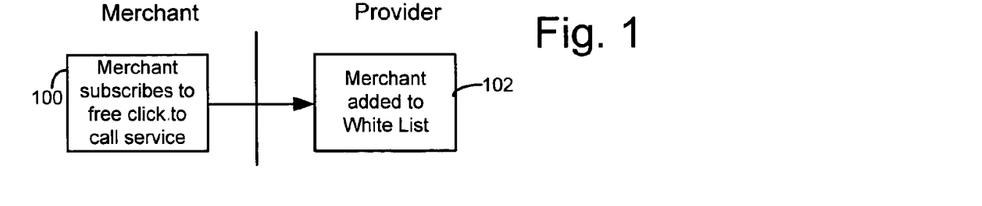
FIG. 1 is a flow chart of an embodiment for merchants to subscribe to the free click-to-call service of the present system.
Figure 2:
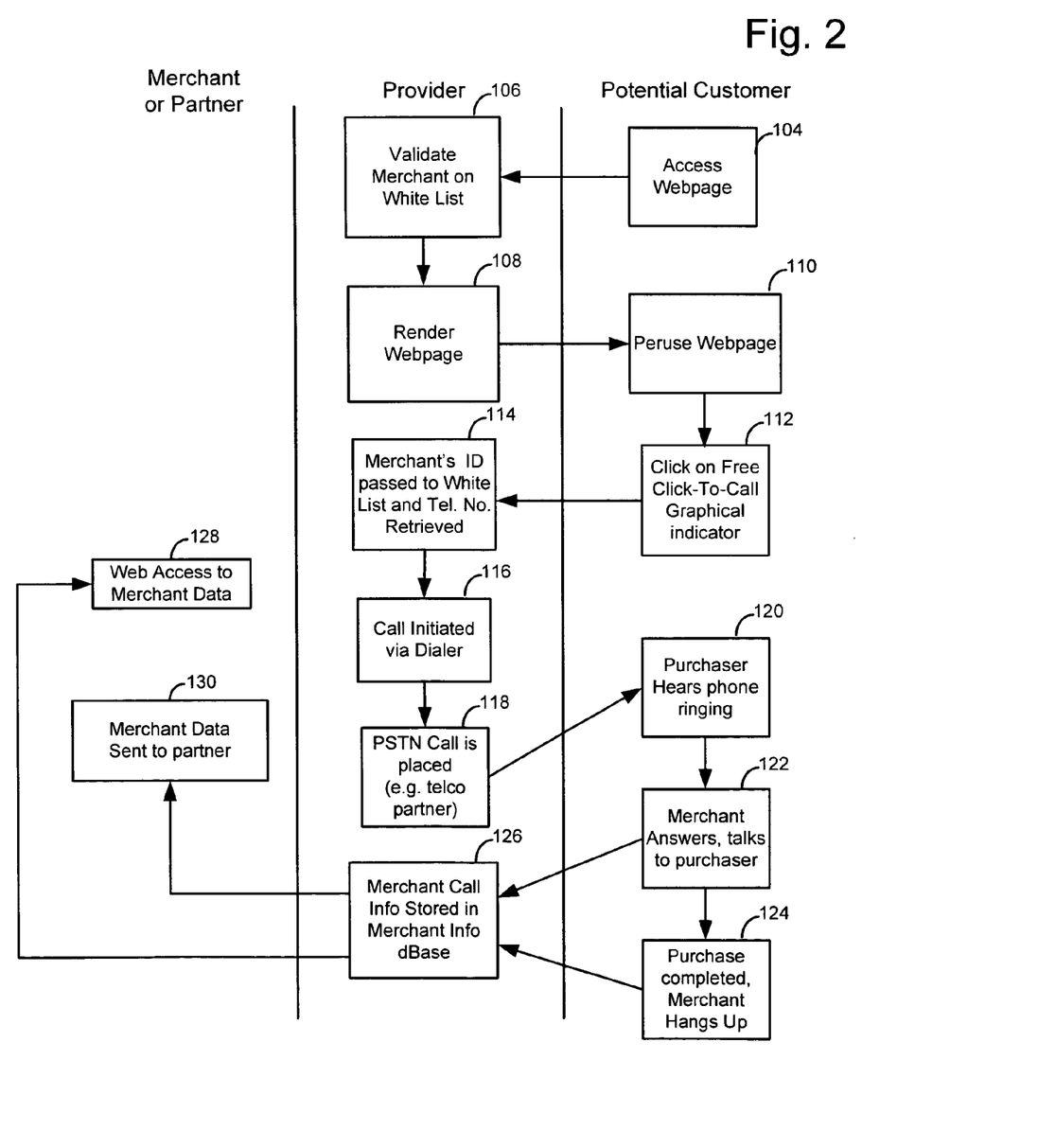
FIG. 2 is a flow chart of an embodiment of the operation of the free click-to-call service of the present system.
Figure 3:
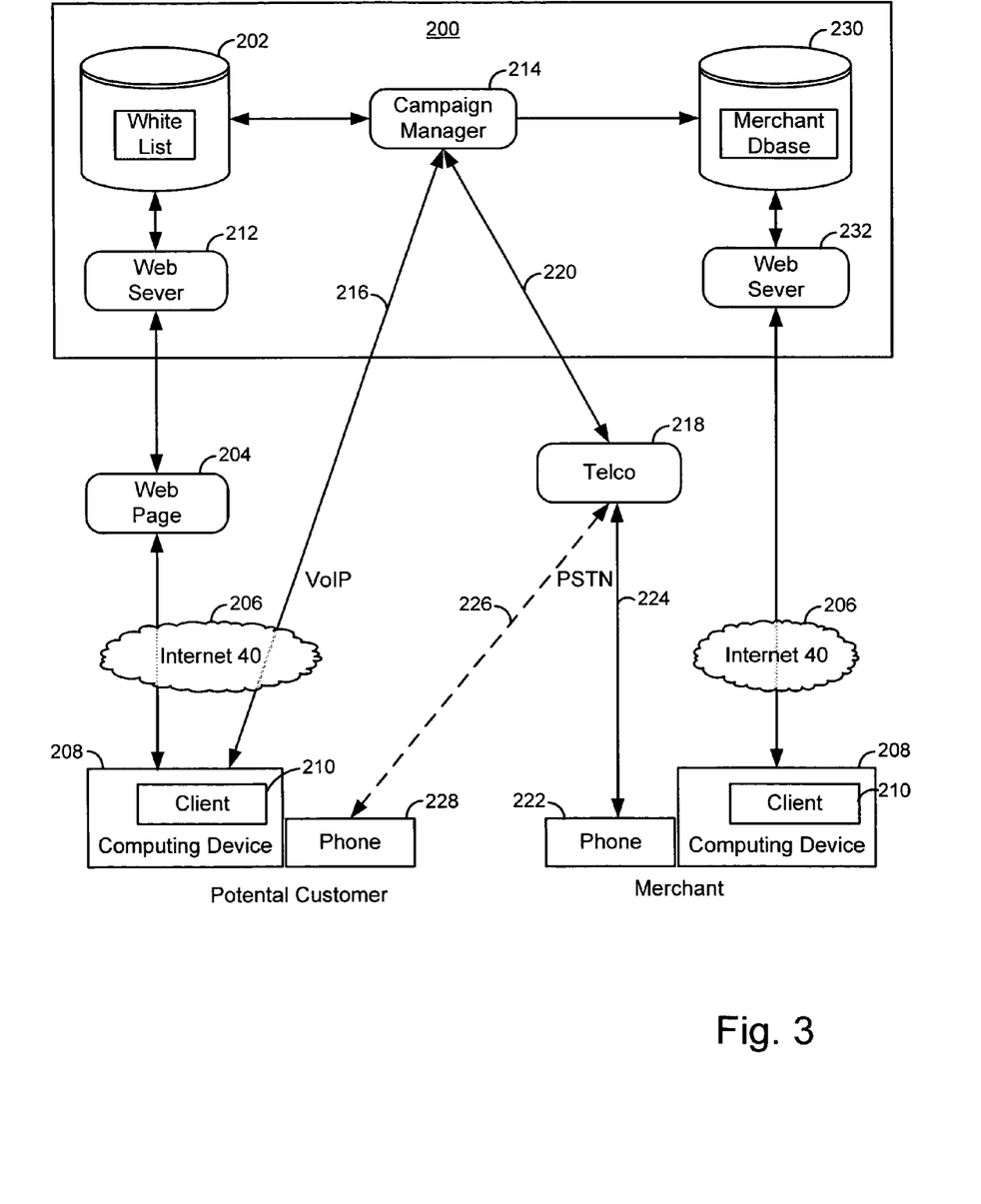
FIG. 3 is a block diagram of a system implementing one embodiment of the free click-to-call service of the present system.

Embodiments of the present system may be implemented by the steps shown in FIGS. 1 and 2, and over a system shown in FIG. 3. FIGS. 1 and 2 are divided to show which steps are performed by which parties, namely, the potential customers, the merchants, and a service provider 200. Service provider 200 may be an enterprise service provider, such as MSN®, Yahoo®, AOL®, or other online service providers. It is understood that at least some of the steps shown in FIGS. 1 and 2 may be performed by parties other than as shown.

As shown in step 100 in FIG. 2, a merchant initially signs up with the service provider 200 for the free click-to-call service according to the present system. In embodiments, upon the merchant subscribing to the free click-to-call service provided by the service provider, the service provider will pay for VoIP telephone calls made by a caller to the merchant, and initiated from an advertisement displayed by the service provider. A merchant may subscribe to the free click-to-call service as part of the pay-per-click subscription described in the Background section. As one example, a merchant can pay the service provider one price for any VoIP calls placed, as well as for the ranking of the merchant's advertisement on a web page. In further embodiment, merchants might pay the service provider only for the display of their advertisements or to see call reporting data that help merchants track advertising campaigns or optimize staffing to better accommodate demand patterns, with the service provider covering all costs of the calls.

Upon subscription to the free click-to-call service, each subscribing merchant is added to a "white list" in step 102, which list is stored on a secure database 202 within service provider 200. As explained hereinafter, the white list may be stored on databases outside of the service provider in alternative embodiments. For each subscribing merchant, the white list may store a unique identifier which may be mapped within the database to the merchant's name, telephone number, and, in embodiments, other identifying merchant information. The white list may be kept current and updated in real time to ensure that when a merchant's advertisement is placed and validated from the white list as explained hereinafter, it contains the most current information relating to the merchant and the merchant's subscription to the free click-to-call service.

As shown in step 104 in FIG. 2, after a merchant subscribes to the service, potential customers may access a web page 204 with the merchant's advertisement over a network such as the Internet 206. As used here, the term "customer" may also include potential customers or others who use the click-to-call service to contact a merchant. As is known in the art, customers may access web page 204 via a computing device 208 which may for example be a desktop computer, a laptop computer, a tablet computer, a hand-held computer, a gaming device, such as an XBox® gaming device from Microsoft Corporation, of Redmond, Wash., a mobile telephone and a personal digital assistant. Computing device 208 may include a client 210 such as for example a web browser. It is understood that client 210 may be additional clients including for example a short message service (SMS) client, and instant messaging client, and/or a client supporting VoIP protocols.

Figure 4:
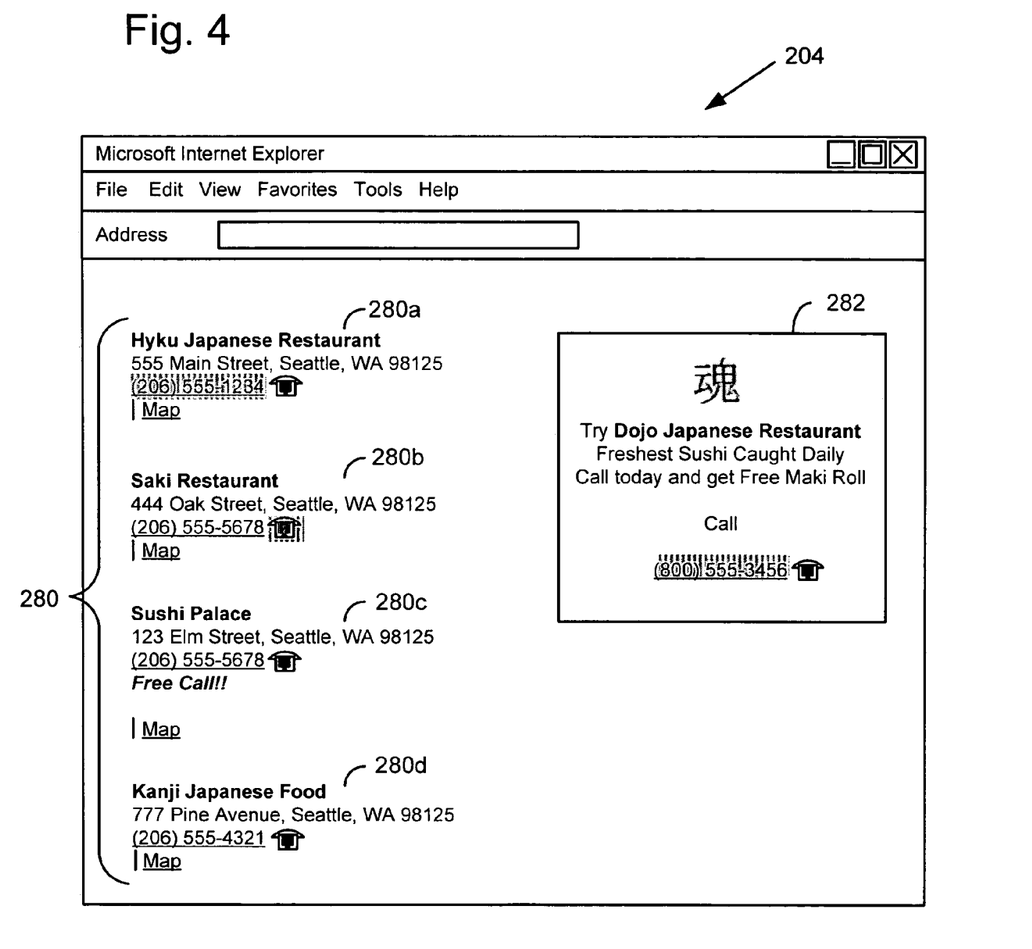
FIG. 4 is an illustrative window presented on a graphical user interface showing a page for potential customers to contact merchants using the free click-to-call service of the present system.

Web page 204 may be any page from the World Wide Web on which a merchant advertisement may be placed. In one embodiment, web page 204 may be search results from a search generated from a search engine. Such pages may include unsponsored search results ranked according to relevancy to a search query and/or sponsored search results ranked according to the merchants' pay-per-click bid. One example of such a search results page is shown in FIG. 4 described hereinafter. Web page 204 may alternatively be any page including a downloaded application program such as for example MSN toolbar. Such toolbars may include merchants' advertisements. The merchant's advertisement may alternatively appear on a web page from a partner of the service provider. For example, an enterprise service provider may partner with an online telephone directory service provider, such as for example 411.com, whitepages.com, or yellowpages.com. In providing search results for a given listing, such partner service providers may also include merchants' advertisements. Web page 204 may also be a merchant's website which includes an advertisement having the free click-to-call service described hereinafter.

In embodiments, web page 204 may be generated from a web server 212 which is part of service provider 200. However, it is understood that web page 204 may be included on a web server which is outside of and independent from service provider 200. Whether part of web server 212, or merely in communication with web server 212, the merchant information displayed on web page 204 is first validated from the white list on database 202 before being rendered on page 204 (step 106). That is, the unique identifier used for each merchant displayed on a page 204 is compared against the unique identifiers stored on the white list to determine which, if any, of the merchants to be rendered on web page 204 subscribe to the free click-to-call service.

Those which subscribe to the service may be rendered on web page 204 with graphical indicators indicating the free click-to-call feature (step 108). For example, referring to FIG. 4, there is shown a sample search results on a web page 204 from a search for Japanese restaurants in the Seattle, Wash. area. It is of course understood that FIG. 4 is by way of example only and by no means is the present system limited to particular searches or particular geographical areas. However, in the example of FIG. 4, the search results include advertising listings 280 and larger space advertisement 282. As shown in FIG. 4, the free click-to-call service for subscribers may be indicated by any of a variety of graphical indicators.

For example, in listing 280a and in the larger space advertisement 282, the free click-to-call service is indicated by highlighting or shading the VoIP telephone number next to the advertisement. The free click-to-call feature may alternatively or additionally be indicated by a highlighted, shaded and/or dedicated icon next to an advertising merchant or the advertising merchant's VoIP telephone number as in advertising listing 280b. Additionally or alternatively, the free click-to-call feature may be indicated by the words "free call" or other verbal phrase as shown in advertising listing 280c. It is understood that a single web page 204 may indicate subscribing merchants with any one of the above-described graphical indicators, or a combination of the above-described graphical indicators. Those of skill in the art would appreciate other ways of visually indicating to potential callers the free click-to-call feature according to the present system.

In embodiments, only those subscribers subscribing to the free click-to-call service would include the free click-to-call indicator. Thus, for example, as shown in FIG. 4, the advertiser at listing 280d does not subscribe to the service and does not include the free click-to-call graphical indicator. However, as explained hereinafter, a service provider may elect to provide the free click-to-call feature to all advertisers returned in a search results page or otherwise provided on a web page 204 regardless of whether the advertisers specifically pay for that feature. In such embodiments, the service provider may generate revenue from the merchants by providing demographic information regarding VoIP telephone calls made, as described hereinafter. As shown in FIG. 4, the free click-to-call service may be associated with both toll-free numbers, such as for example larger space advertisement 282, as well as toll numbers such as shown in advertising listings 280.

After subscribers to the free click-to-call service are validated by the white list in step 106, the web page is rendered in step 108 and may be perused by a potential purchaser in step 110. Potential purchasers who wish to establish a telephone session with a merchant utilizing the free click-to-call feature may click on an advertisement, telephone number, and/or icon including the free click-to-call indicator in step 112.

After a potential customer clicks on the merchant listing, telephone number, or icon in step 112, the unique identifier for the selected merchant is passed to the white list in step 114. The white list retrieves an approved telephone number associated with the unique merchant identifier, which telephone number is then used to establish a telephone session between the potential customer and the merchant in steps 116 and 118 as explained in greater detail hereinafter.

In embodiments, for security reasons, clicking on the telephone number on web page 204 does not itself directly initiate the VoIP telephone session. Otherwise, it may be possible for users to hijack the listed telephone link to place a VoIP telephone call using the displayed link to a recipient other than the displayed merchant. Thus, in embodiments, clicking on a link does not initiate the VoIP call, but instead causes the approved telephone number to be retrieved from the white list for that merchant, and the VoIP call thereafter affected by the campaign manager. However, it is understood that clicking on the number in web page 204 may directly initiate the VoIP telephone call to the merchant in alternative embodiments.

In step 116 mentioned above, the database 202 pushes the approved telephone number in a known file format to a campaign manager 214 within the service provider 200. Campaign manager 214 may be a known hardware and/or software device for affecting and controlling VoIP telephone calls by standard session initiation protocols ("SIP"). As is known in the art, SIP is a standard protocol for initiating interactive user sessions involving multimedia elements such as VoIP.

In one embodiment, as indicated above, a VoIP client may be downloaded to the computing device 208 of the potential customer. In such embodiments, the campaign manager 214 may include a software dialer of known design for initiating a VoIP telephone call from the caller over a VoIP connection 216, which call may then be routed over a node to a PSTN telephone company partner 218 over a connection 220. Thereafter, the telephone company partner may complete the PSTN telephone call to a merchant telephone 222 over a PSTN connection 224 in step 118.

In an alternative embodiment where the potential customer does not have a VoIP client on his/her computing device 212, the campaign manager may present a web page or otherwise allow the potential customer to contact the merchant over a PSTN telephone call. For example, the campaign manager may prompt the telephone company partner to establish a PSTN connection 226 with the potential customer's telephone 228. The telephone company partner may then establish the PSTN connection 224 with the merchant's telephone 222 allowing the potential customer and merchant to speak to each other.

In the embodiment of FIG. 3, the merchant includes a PSTN telephone for receiving telephone calls from potential customers. Those of skill in the art will appreciate that the merchant may additionally or alternatively include VoIP capabilities within computing device 208 for receiving telephone calls. In such embodiments, the PSTN connection 224 to the merchant's telephone 222 may be replaced by a VoIP connection to the merchant's computing device 208. Those of skill in the art will appreciate other methods and protocols by which campaign manager 214 may initiate and control telephone calls between potential customers and merchants.

It is a further aspect of the present system that call signaling for VoIP calls may be sent over different pathways than the actual media stream (content) of the VoIP calls. Often calls are initiated from behind firewalls or secure networks, which block outgoing VoIP calls. By separating the call signals from the media stream it is often easier for these calls to pass through secure networks.

As discussed above, computing device 208 may be a variety of devices including a mobile telephone. In embodiments where computing device 208 is a mobile telephone, the present system provides the ability to initiate VoIP telephone calls through the mobile telephone using the free click-to-call service described above. In such embodiments, the cost of the call may be covered by the merchant, and may not count toward the user's minutes on their mobile telephone plan. As discussed in the previous paragraph, call signaling and media signals may be separate. Thus, a telephone call may be initiated using VoIP protocols as described above, and then the media signal may go over the mobile phone PSTN.

The above described steps 116, 118 may be invisible to the caller. Once a call is placed to a merchant in steps 116, 118, a purchaser may simply here the phone ringing in step 120, and a merchant may answer the call in step 122. Thereafter, the call session between the potential purchaser and merchant takes place. If successful, the purchase is completed and the call is terminated in step 124.

In embodiments of the present system, the campaign manager 214 further monitors information regarding the telephone call and passes that information to a merchant database 230 in a step 126. The merchant call information includes the place from which the potential customer placed the telephone call, the time the telephone call was placed, and/or the duration of the telephone call. Other merchant call information may be stored in merchant database 230. For example, in alternative embodiments, personal information of the caller may be known to the service provider and this information may also be stored in the merchant database along with the merchant call information.

In a further aspect to the present system, a merchant may access the merchant call information stored in merchant database 230 to gain valuable insight into the effectiveness of their advertisements. For example, a merchant can access the merchant call information in a step 128 via a network connection 206 and a web server 232 communicating the merchant database 230 on service provider 200. Web server 232 may be the same as or different than web server 212 which provides white list information. However, the merchant would access the merchant call information from merchant database 230 via a secure connection which in embodiments will be authenticated by the result of the merchant setting up a log-on name and password with their subscription.

The demographics a merchant may receive for the merchant database 230 include the number of telephone calls placed to the merchant over a given period of time. This information may allow the merchant to evaluate how effective the merchant's advertisement is in getting people to call the merchant's establishment. The merchant database 230 may also include where telephone calls are coming from. This information may allow the merchant to focus their efforts on that area or to expand their service to include that area. The merchant database 230 may further provide the merchant with information relating to when calls are made. This information may allow a merchant to determine whether large numbers of unanswered calls are being made before or after the merchant's business hours. Moreover, if it is determined that the merchant receives a higher frequency of calls at given times, the merchant can increase their sales force during those times to better respond to the increased call rate at those times. The merchant database 230 may additionally provide the merchant with information regarding how long the telephone calls last. This will allow the merchant to determine whether hold times are longer at certain times, or whether calls take a longer period of time during certain times.

In this way, the free click-to-call system utilizing the merchant database of merchant call information can provide merchants with more information as to the effectiveness of their advertisements and allows merchants to focus their advertisements and sales efforts where they will provide the greatest returns.

Campaign manager 214 may include software for preventing click fraud. Click fraud may occur where competitors try and increase the cost to a merchant by making repeated VoIP calls to the merchant. Campaign manager 214 may address this problem by limiting calls from a single caller. Or, campaign manager 214 may only charge merchants where calls to the merchant last longer than a preset time period, such as for example 5 seconds. This would also allow merchants to avoid having to pay for aborted telephone calls made to the merchant by mistake.

While various subscription scenarios are contemplated, a merchant in general pays the service provider for the demographic information received for the merchant database, as well as for the cost of the telephone calls covered by the service provider. In one subscription model, the merchant may pay a single price for both of these services. Alternatively, these services may be paid for separately so that the merchant pays for the demographic information and may for example pay per call made via a service provider. In a further subscription model, as briefly discussed above, the subscriber may provide free click-to-call service to all merchants, and simply have the merchants pay for the demographic information. In this model, all merchants appearing on web page 204 would have free click-to-call graphics and a step 106 of validating merchants may be omitted. Other payment scenarios for different subscriptions are contemplated.

In a further aspect of the present system, in addition to merchants receiving demographic information, competitors of the merchant who do not subscribe to the free click-to-call service, but still want demographic information, may receive it. Competitors may receive aggregate information about VoIP telephone call patterns. For example, a competitor may receive information relating to the aggregate number of calls made to an area or from an area in a given period of time. The competitor may receive average call duration and/or average call frequency over the course of a day/week/month, etc. Competitors may receive additional aggregate call information in alternative embodiments.

In many embodiments described above, interaction between potential customers and merchants is controlled through a single service provider 200, for example an enterprise service provider such as MSN®. In further embodiments, one or more of the above-described processes may be split between two service providers, for example an enterprise service provider and a partner service provider. As discussed above, such partners may include other search engine or directory services, such as for example 411.com, whitepages.com and yellowpages.com.

For example, in an embodiment, the white list could be hosted by the service provider but made available and accessible to the partner service provider. Alternatively, the white list could be hosted by the service provider 200, but made available and accessible to the partner service provider. Alternatively, the white list may be hosted entirely on a partner service provider website. Similarly, the merchant database may be hosted on by the service provider, but made available and accessible to the partner service provider. Alternatively, the merchant database may be hosted entirely on a partner service provider website. In such an embodiment, the merchant call information may be obtained from the merchants from the partner service providers (as indicated in step 130 of FIG. 2).

Figure 5:
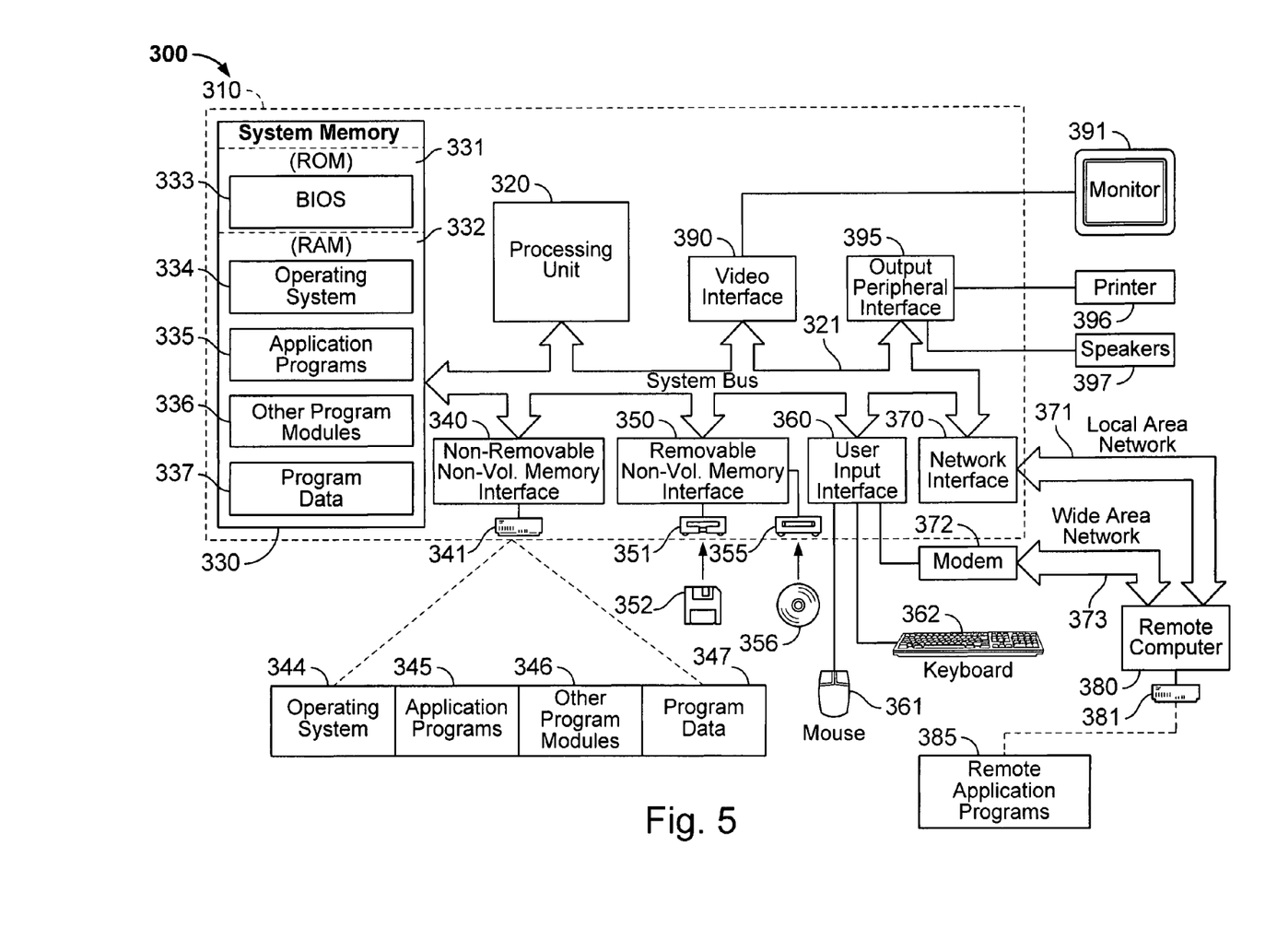
FIG. 5 is a block diagram of computer hardware suitable for implementing embodiments of the present system.

FIG. 5 illustrates an example of a suitable general computing system environment 300 that may comprise any processing device shown herein on which the inventive system may be implemented. The computing system environment 300 is only one example of a suitable computing environment and is not intended to suggest any limitation as to the scope of use or functionality of the inventive system. Neither should the computing system environment 300 be interpreted as having any dependency or requirement relating to any one or combination of components illustrated in the exemplary computing system environment 300.

The inventive system is operational with numerous other general purpose or special purpose computing systems, environments or configurations. Examples of well known computing systems, environments and/or configurations that may be suitable for use with the inventive system include, but are not limited to, personal computers, server computers, multiprocessor systems, microprocessor-based systems, set top boxes, programmable consumer electronics, network PCs, minicomputers, mainframe computers, laptop and palm computers, hand held devices, distributed computing environments that include any of the above systems or devices, and the like.

With reference to FIG. 5, an exemplary system for implementing the inventive system includes a general purpose computing device in the form of a computer 310. Components of computer 310 may include, but are not limited to, a processing unit 320, a system memory 330, and a system bus 321 that couples various system components including the system memory to the processing unit 320. The system bus 321 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 310 may include a variety of computer readable media. Computer readable media can be any available media that can be accessed by computer 310 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile discs (DVD) or other optical disc storage, magnetic cassettes, magnetic tape, magnetic disc storage or other magnetic storage devices, or any other medium which can be used to store the desired information and which can be accessed by computer 310. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above are also included within the scope of computer readable media.

The system memory 330 includes computer storage media in the form of volatile and/or nonvolatile memory such as ROM 331 and RAM 332. A basic input/output system (BIOS) 333, containing the basic routines that help to transfer information between elements within computer 310, such as during start-up, is typically stored in ROM 331. RAM 332 typically contains data and/or program modules that are immediately accessible to and/or presently being operated on by processing unit 320. By way of example, and not limitation, FIG. 5 illustrates operating system 334, application programs 335, other program modules 336, and program data 337.

The computer 310 may also include other removable/non-removable, volatile/nonvolatile computer storage media. By way of example only, FIG. 5 illustrates a hard disc drive 341 that reads from or writes to a non-removable, nonvolatile magnetic media and a magnetic disc drive 351 that reads from or writes to a removable, nonvolatile magnetic disc 352. Computer 310 may further include an optical media reading device 355 to read and/or write to an optical media.

Other removable/non-removable, volatile/nonvolatile computer storage media that can be used in the exemplary operating environment include, but are not limited to, magnetic tape cassettes, flash memory cards, digital versatile discs, digital video tape, solid state RAM, solid state ROM, and the like. The hard disc drive 341 is typically connected to the system bus 321 through a non-removable memory interface such as interface 340, magnetic disc drive 351 and optical media reading device 355 are typically connected to the system bus 321 by a removable memory interface, such as interface 350.

The drives and their associated computer storage media discussed above and illustrated in FIG. 5 provide storage of computer readable instructions, data structures, program modules and other data for the computer 310. In FIG. 5, for example, hard disc drive 341 is illustrated as storing operating system 344, application programs 345, other program modules 346, and program data 347. These components can either be the same as or different from operating system 334, application programs 335, other program modules 336, and program data 337. Operating system 344, application programs 345, other program modules 346, and program data 347 are given different numbers here to illustrate that, at a minimum, they are different copies. A user may enter commands and information into the computer 310 through input devices such as a keyboard 362 and a pointing device 361, commonly referred to as a mouse, trackball or touch pad. Other input devices (not shown) may include a microphone, joystick, game pad, satellite dish, scanner, or the like. These and other input devices are often connected to the processing unit 320 through a user input interface 360 that is coupled to the system bus 321, but may be connected by other interface and bus structures, such as a parallel port, game port or a universal serial bus (USB). A monitor 391 or other type of display device is also connected to the system bus 321 via an interface, such as a video interface 390. In addition to the monitor, computers may also include other peripheral output devices such as speakers 397 and printer 396, which may be connected through an output peripheral interface 395.

The computer 310 may operate in a networked environment using logical connections to one or more remote computers, such as a remote computer 380. The remote computer 380 may be a personal computer, a server, a router, a network PC, a peer device or other common network node, and typically includes many or all of the elements described above relative to the computer 310, although only a memory storage device 381 has been illustrated in FIG. 5. The logical connections depicted in FIG. 5 include a local area network (LAN) 371 and a wide area network (WAN) 373, but may also include other networks. Such networking environments are commonplace in offices, enterprise-wide computer networks, intranets and the Internet.

When used in a LAN networking environment, the computer 310 is connected to the LAN 371 through a network interface or adapter 370. When used in a WAN networking environment, the computer 310 typically includes a modem 372 or other means for establishing communications over the WAN 373, such as the Internet. The modem 372, which may be internal or external, may be connected to the system bus 321 via the user input interface 360, or other appropriate mechanism. In a networked environment, program modules depicted relative to the computer 310, or portions thereof, may be stored in the remote memory storage device. By way of example, and not limitation, FIG. 5 illustrates remote application programs 385 as residing on memory device 381. It will be appreciated that the network connections shown are exemplary and other means of establishing a communications link between the computers may be used.

The foregoing detailed description of the inventive system has been presented for purposes of illustration and description. It is not intended to be exhaustive or to limit the inventive system to the precise form disclosed. Many modifications and variations are possible in light of the above teaching. The described embodiments were chosen in order to best explain the principles of the inventive system and its practical application to thereby enable others skilled in the art to best utilize the inventive system in various embodiments and with various modifications as are suited to the particular use contemplated. It is intended that the scope of the inventive system be defined by the claims appended hereto.

We claim:

1. A method of providing a voice connection between a customer and a merchant via a connection manager of a service provider, the customer being presented with a telephone number for the merchant over a web page, the method comprising the steps of:
    (a) storing in memory associated with one or more servers of the service provider a listing of unique identifiers and associated telephone numbers for merchants who have subscribed to have the service provider provide voice connections between the merchants and customers;
    (b) providing a webpage via the one or more servers, the webpage displaying merchant information for merchants who have subscribed with the service in said step (a), the merchant information including a telephone number;
    (c) receiving an indication at the one or more servers of a selection of a telephone number associated with merchant information displayed on the webpage
    (d) retrieving from memory a unique identifier for the merchant whose telephone number was selected from the web page by the customer;
    (e) mapping by the one or more servers the unique identifier retrieved in said step (d) to a telephone number for the merchant stored in said step (a);
    (f) connecting the customer to the merchant via a voice over IP telephone call through the one or more servers using the telephone number mapped in said step (e), said step (f) of connecting the customer to the merchant comprising steps of: i) sending calling signals for establishing the telephone call over a first voice over IP pathway, ii) transforming voice from the voice over IP telephone call into voice signals, and iii) sending a media stream of the voice signals for the telephone call over a second voice over IP pathway different than the first voice over IP pathway; and
    (g) arranging via the one or more servers for the telephone interaction between the customer and the merchant to be free of charge to the customer, said step (g) of arranging including the step of the merchant agreeing to pay charges for the telephone interaction.

2. A method of facilitating a telephone interaction between a customer and a merchant via a service provider as recited in claim 1, further comprising the step of selecting a web page using a mobile phone, the step of sending a media stream for the telephone call comprising the step of sending the media stream over a public switched telephone network mobile telephone connection.

3. A method of providing a voice over IP telephone session between a merchant and customers via a connection manager of a service provider, the method comprising the steps of:
    (a) offering, from the service provider, a subscription to the merchant for a service allowing the customers to identify the merchant from a webpage and contact the merchant via a telephone connection through the service provider;
    (b) maintaining, at one or more servers of the service provider, a list of merchants that have subscribed to the service, the list including an identifier for subscribing merchants and a telephone number for subscribing merchants;
    (c) receiving, at the one or more servers, an indication that a customer wishes to establish a telephone session with a merchant;
    (d) validating, by the one or more servers, whether the merchant indicated in said step (c) subscribes to the service offered in said step (a);
    (e) outputting from the one or more servers a telephone number for the merchant indicated in said step (c) to a dialer to establish the telephone session between the customer and merchant, the dialer being a software dialer for initiating a VoIP telephone call from the caller over a voice over IP connection;
    (f) dialing the merchant by the dialer to establish the telephone session between the customer and the merchant;
    (g) transforming voice from the telephone session into voice signals;
    (h) storing, in a database associated with the one or more servers, information from the voice signals relating to the telephone session;
    (i) providing, by the service provider, the information stored in said step (h) to the merchant;
    (j) providing, by the service provider, the information stored in said step (h) to a competitor of the merchant.

4. The method recited in claim 1, further comprising the step of presenting an advertisement for the subscribing merchant to customers in response to searches by the customers for goods and/or services provided by the subscribing merchants.

5. The method recited in claim 1, the web page being identified from accessing an advertisement for the merchant from one of: a toolbar, an online search directory and a website operated by the merchant.

6. The method recited in claim 1, the step (f) of connecting a customer to a merchant comprising the step of passing the telephone number mapped in said step (e) to a dialer to establish the telephone connection.

7. The method recited in claim 1, further comprising the step of updating the list of merchants subscribing to the service in real time.

8. The method recited in claim 1, further comprising the step of generating demographic information for the merchant relating to customers that contact the merchant.

9. The method recited in claim 8, the step of generating demographic information comprising the steps of storing information relating to at least one of: the number of calls from customers, the duration of the calls from customers, the location of origin of calls from customers, and the time at which calls from customers are made.

10. The method recited in claim 3, further comprising the step of arranging for the telephone interaction between the customer and the merchant to be free of charge to the customer.

11. The method recited in claim 10, further comprising the step of the merchant paying a service provider a fee for each call completed to that merchant.

12. The method recited in claim 3, said step of storing information relating to the telephone session comprising the step of storing information relating to at least one of: a) a location where the customer initiated the voice over IP telephone interaction, b) a time when the customer initiated the voice over IP telephone interaction, c) a length of the voice over IP telephone interaction, and d) personal information relating to the customer.

13. The method recited in claim 3, further comprising the step of facilitating a voice over IP telephone connection of the customer to the merchant.

14. The method recited in claim 3, further comprising the step of facilitating a public switched telephone network telephone connection of the customer to the merchant.

15. A storage media for programming a processor to perform a method of facilitating a telephone interaction between a customer and a merchant via a service provider, the customer being presented with a telephone number for the merchant over a web page, the method comprising the steps of:

(a) providing a webpage including merchant information, said step (a) including the step of:

(i) validating merchant information against a stored list of merchant information, the webpage displaying the merchant information if and only if the merchant information is validated in said step (a)(i);

(b) receiving a unique identifier for the merchant whose telephone number was selected from the web page by the customer;

(c) mapping the unique identifier received in said step (b) to a telephone number for the merchant;

(d) establishing a voice connection between the customer and the merchant using the telephone number mapped in said step (c), said step (d) of establishing a connection between the customer and the merchant comprising step of sending calling signals for establishing the telephone call over a first voice over IP pathway, and sending a media stream for the telephone call over a second voice over IP pathway different than the first voice over IP pathway; and (e) arranging for the telephone interaction between the customer and the merchant to be free of charge to the customer.

16. The storage media of claim 15, the method further comprising the step of selecting a web page using a mobile phone, the step of sending a media stream for the telephone call comprising the step of sending the media stream over a public switched telephone network mobile telephone connection.

17. The storage media of claim 15, the method further comprising the step of presenting an advertisement for the subscribing merchant to customers in response to searches by the customers for goods and/or services provided by the subscribing merchants.

18. The storage media of claim 15, the step of the step (d) of establishing a connection between the customer and a merchant comprising the step of passing the telephone number mapped in said step (c) to a dialer to establish the telephone connection.

19. The storage media of claim 15, the method further comprising the step of updating the list of merchants subscribing to the service in real time.

20. The storage media of claim 15, the method further comprising the step of generating demographic information for the merchant relating to customers that contact the merchant.

* * * * *